USOO8195850B2

(12) United States Patent
Wang et al.

(10) Patent No.: US 8,195,850 B2
(45) Date of Patent: Jun. 5, 2012

(54) UNIVERSAL BIDIRECTIONAL SERIAL DATA TRANSPORT INTERFACE AND ITS DATA TRANSPORT METHOD

(75) Inventors: Xingjun Wang, Beijing (CN); Yonglin Xue, Beijing (CN)

(73) Assignee: United Technologies Inc., Beijing (CN)

( * ) Notice: Subject to any disclaimer, the term of this patent is extended or adjusted under 35 U.S.C. 154(b) by 738 days.

(21) Appl. No.: 10/567,047

(22) PCT Filed: Aug. 3, 2004

(86) PCT No.: PCT/CN2004/000892
§ 371 (c)(1),
(2), (4) Date: Jun. 19, 2007

(87) PCT Pub. No.: WO2005/013112
PCT Pub. Date: Feb. 10, 2005

(65) Prior Publication Data
US 2008/0010663 A1 Jan. 10, 2008

(30) Foreign Application Priority Data
Aug. 3, 2003 (CN) .................................. 03 1 44093

(51) Int. Cl.
*G06F 3/00* (2006.01)
*G06F 13/12* (2006.01)
*G06F 13/38* (2006.01)

(52) U.S. Cl. ................................ 710/65; 710/30; 710/71

(58) Field of Classification Search .................... 710/65, 710/30, 71
See application file for complete search history.

(56) References Cited

U.S. PATENT DOCUMENTS

| 7,254,236 B1* | 8/2007 | Eskicioglu et al. ........... 380/239 |
| 2001/0047441 A1* | 11/2001 | Robertson ........................ 710/65 |
| 2004/0088456 A1* | 5/2004 | Zhang .............................. 710/74 |
| 2004/0260823 A1* | 12/2004 | Tiwari et al. ................... 709/230 |

FOREIGN PATENT DOCUMENTS

| CN | 1417985 | 5/2003 |
| DE | 10140289 | 2/2003 |

* cited by examiner

*Primary Examiner* — Chun-Kuan Lee
*Assistant Examiner* — Zachary K Huson
(74) *Attorney, Agent, or Firm* — Alston & Bird LLP

(57) ABSTRACT

A UTI (Universal Transport Interface) is provided in the invention, the UTI comprising a transceiving unit, configured to receive and transmit data which accords with USB (Universal Serial Bus) specification; a detecting unit, configured to detect the data received by the transceiving unit to determine whether to convert the received data into data which accords with a particular specification; and a conversion unit, configured to convert the received data into the data which accords with the particular specification when determining that the received data should be converted into the data which accords with the particular specification, and to convert the transmission data which accords with the particular specification into data which accords with the USB specification for transmission via the transceiving unit. With the UTI provided in the invention, service cards may be separated from devices for DTV and various value-added services may be provided.

42 Claims, 15 Drawing Sheets

| Field | Sync | PID | Data field | CRC |
|---|---|---|---|---|
| Bits | 32 | 8 | Nx188x8 | 16 |

| Field | Sync | PID | Payload |
|---|---|---|---|
| Content | 0x47 | 13bits | USB data 184x8bits |

UNIVERSAL BIDIRECTIONAL SERIAL DATA TRANSPORT INTERFACE AND ITS DATA TRANSPORT METHOD

CROSS-REFERENCE TO RELATED APPLICATIONS

This patent application is a national stage filing under 35 U.S.C. 371 of International Application No. PCT/CN2004/000892, filed Aug. 3, 2004, and claims priority to Chinese Patent Application No. 03144093.2, filed Aug. 3, 2003.

FIELD OF THE INVENTION

The present invention relates generally to a data transport interface, and more particularly, to a USB (Universal Serial Bus) interface for communication and data transport between a digital signal processing host device (for example, a digital television (DTV) receiver) and an external service module (for example, a conditional access (CA) module for DTV), and the data transfer method thereof.

BACKGROUND OF THE INVENTION

With progress of digital multimedia, digital communication technology and digital Audio or Video broadcasting technology, the digital television (DTV) market has exhibited strong development potential in many countries across the world. In contrast to conventional analog TV, DTV has many desirable advantages, like low power consumption, efficient use of spectrum, high quality of received programs, convenience in service integration and so on, and in particular, DTV can provide interactive TV services to enable more individualized services so that people may subscribe TV programs according to their favorites.

DTV provides such an individualized service through a payment system. To protect interests of the program providers and prevent unauthorized access, scrambling operation is performed on the video, audio, auxiliary data and other control data to be transmitted to each DTV device, so as to implement conditional access (CA). In this way, only authorized subscribers can de-scramble the video, audio and other data to view the desired program.

For the CA system itself, there are various standards currently provided with some basic schemes, but no uniform standard is defined yet. As a result, the internal mechanisms of various CA systems are often defined by each CA equipment vendor respectively. Accordingly, CA systems developed by various vendors are different in a sort of way and the encryption techniques are not compatible with each other. As such, a CA system selected by a network operator is generally private, that is, if a network operator deploys a system available from a CA equipment vendor, the subscribers can receive programs from the operator only when using the device products (such as DTV receivers (Set-Top Box) or DTV sets) matching with the CA system. If the operator changes its CA system, the DTV receiver of the subscriber will have to be changed accordingly. Therefore, in current DTV technologies, DTV receiving devices (DTV receivers or DTV sets) are usually bound with the CA system, which limits the development of DTV significantly. There is, therefore, a need for separation of the CA system from the DTV receiver, that is, separation of service cards from devices. By separating service cards from devices, device products may be independent of the services provided by the operator. This solution may release the restrictions upon the development of DTV industry that the CA system imposes, as well as provide a solid foundation for the extension of value-added services in the future.

To implement separation of service cards from devices, the first problem to be settled is to provide a standard interface for transmitting data streams between the CA modules and the DTV receiving devices. Data streams to be transmitted in DTV devices are generally transport streams (TS) that accord with MPEG (Motion Picture Experts Group) specification. Existing specific interfaces for transmitting MPEG TS data, such as SPI (Synchronous Parallel Interface) and ASI (Asynchronous Serial Interface), are not suitable to communicate the data having no TS frame structure, especially asynchronous data, such as control commands and only unidirectional transport may be conducted. Such specific interfaces are thus not suitable for separation of service cards from devices.

To implement separation of service cards from devices, interfaces which accord with PCMCIA (Personal Computer Memory Card International Association) specification, i.e. PC card interfaces, are employed in current European standard EN50221 CI (Common Interface) and American standard SCTE DVS295 HOST-POD (Point of Deployment), to transmit MPEG TS data. With regard to the interfaces for the two standards, signal definition related to the TS input and output is similar to that in SPI, i.e. two SPIs acting as the input and output. Furthermore, both Cl and HOST-POD have an 8-bit asynchronous I/O interface for transmitting control commands while transmitting MPEG TS, so as to implement intercommunication and interoperability between the two sides connected via the interface. However, when PCMCIA interface is adopted to implement bidirectional transport of MPEG TS and intercommunication, the interface is too complicated, the cost goes higher and the transfer rate is not high comparatively. Particularly, the two interfaces are dedicated for specific services and are not universal, thus cannot be applied to any other device for services other than the specific services.

With fast development of diversified services, subscribers always hope their purchased devices have good compatibility and extensibility. There is, therefore, a need for a more universal bidirectional data transport interface to implement separation of service cards from devices.

Among the current universal bidirectional data transport interfaces, USB (Universal Serial Bus) interface has excellent performance and is applied widely. USB interface is mainly characterized in following features: it can easily be extended to be compatible with different types of devices and has low cost; USB 2.0 supports the data transfer with high speed mode up to 480 Mbps; support real-time data (audio and video data) transportation, support for PnP (Plug and Play) function; and its physical interface is suitable for coupling directly to USB portable devices rather than through cables. Besides, USB interface further supports data transfer for the most fundamental types, such as control transfer for configuring ports in connection, and interrupt data transfer for transferring real-time and reliable data, like echo or response.

While USB interface has the above advantages, there are some pending problems for transmitting MPEG TS data by using USB interface directly, because specific interface definition and data transport protocol are used in USB. To implement bi-directional real-time transport of synchronous MPEG TS, for example, USB interface needs two logic channels as its input and output, respectively. Meanwhile, although each frame may transfer data of fixed bytes in USB, data is not conveyed at its practical fixed rate, but in bursts at the intrinsic rate of the shared bus, for example, 480 Mbps. If MPEG TS, which should be transmitted at a constant rate, is transferred via USB, a buffer is needed to smooth the data rate, which leads to difficulty in clock recovery or phase locking of the source data. Furthermore, USB interface adopts input/output transaction and table header, fixed-rate frame structure and synchronization and identifier field definition. Accordingly, the transfer efficiency will decrease due to mismatch in packet structure, when encapsulating data streams whose transportation requires a particular structure of synchronous MPEG TS packets.

To adapt to the increasing MPEG TS-related services, especially the development of DTV and the trend that future new digital devices are provided with universal data communication interface, there is a need for a bi-directional serial data transport interface, which has the functionality of a universal USB interface and can satisfy real-time application of MPEG TS.

SUMMARY OF THE INVENTION

An object of the invention is to provide a universal bi-directional data transport interface, which, as an interconnection interface, can have the functionality of a universal USB interface and can satisfy real-time application of MPEG TS services as well, so as to connect various types of peripherals and facilitate functional extension and diversity and lower cost.

In an aspect of the invention, the invention provides a data transport interface, comprising a transceiving unit, configured to receive and transmit data which accords with USB (Universal Serial Bus) specification; a detecting unit, configured to detect the data received by the transceiving unit to determine whether to convert the received data into data which accords with a particular specification; and a conversion unit, configured to convert the received data into the data which accords with the particular specification when determining that the received data should be converted into the data which accords with the particular specification, and to convert the data to be transmitted which accords with the particular specification into data which accords with the USB specification, for transmission via the transceiving unit.

In another aspect of the invention, the invention further provides a digital signal processing apparatus equipped with the above-mentioned data transport interface.

In still another aspect of the invention, the invention provides a data transfer method, comprising steps of receiving data which accords with USB specification; detecting the received data to determine whether the received data contains a piece of identification information, the identification information indicating that the received data can be converted into data which accords with a particular specification; and converting the received data into the data which accords with the particular specification when detecting the identification information.

Other objects and attainments together with a more full understanding of the invention will become apparent and appreciated by referring to the following descriptions and claims taken in conjunction with the accompanying drawings.

BRIEF DESCRIPTION OF THE DRAWINGS

Detailed descriptions will be made below to specific embodiments of the invention with reference to accompanying drawings, wherein.

Throughout all the above drawings, like reference numerals will be understood to refer to like, similar or corresponding features or functions.

DETAILED DESCRIPTION OF THE INVENTION

Based on the idea of conducting communication and data transport between a digital signal processing host device (for example, a DTV receiver) and an external service module (i.e service card, for example, a CA module) through a universal data transport interface as provided in the invention, a solution is to encapsulate the data which accords with MPEG specification (abbreviated as MPEG TS) into the payload of the data which accords with USB specification (abbreviated as USB data), to transmit the MPEG TS data via the universal interface which accords with USB specification. The universal transport interface (UTI) based on the USB specification has good universality and extensibility and can be applied to connect devices for various types of services.

Detailed description will be given below to the structure of the UTI based on the USB specification as provided in the invention with reference to accompanying drawings and corresponding examples are given herein.

Figure 1:
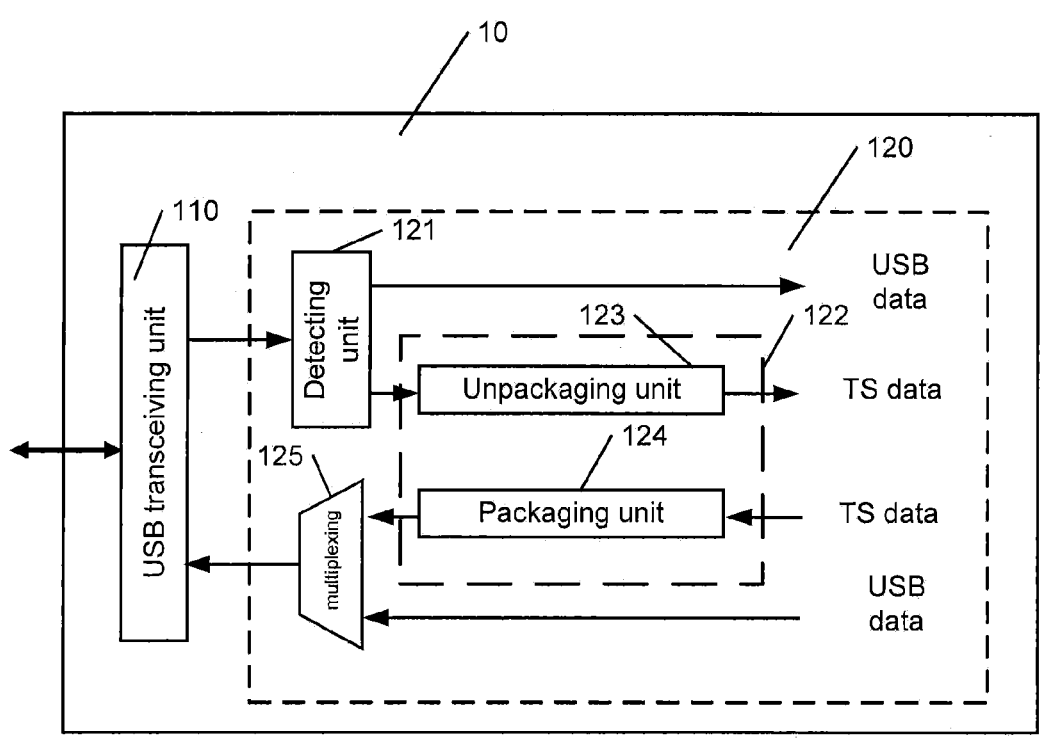
FIG. 1 illustrates a universal data transport interface according to an embodiment of the invention.

FIG. 1 illustrates a UTI 10 according to an embodiment of the invention. The UTI 10 comprises a USB transceiving unit 110 and an interface processing unit 120.

Figures 2, 3:
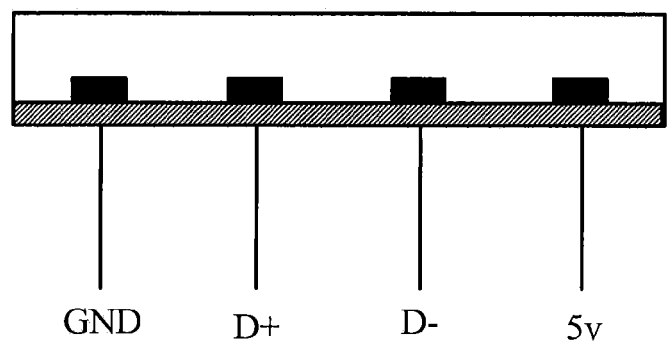
FIG. 2 shows the electrical definition of a transceiving unit that accords with the specification of USB interface.
FIG. 3 shows the data structure for encapsulating the TS data that accords with MPEG specification into the data that accords with USB specification according to an embodiment of the invention.

The USB transceiving unit 110 of FIG. 1 is configured to receive and transmit USB data, and its mechanical and electrical characteristics accord with the USB interface specification. FIG. 2 shows the electrical definition of the USB interface shown in FIG. 1. As shown in FIG. 2, the USB interface comprises a bi-directional differential signal pair D+ and D− for transmitting the data, and the power supply (5V) and the ground (GND).

Referring to the UTI 10 of FIG. 1, the interface processing unit 120 is mainly used to process the data transferred via the USB transceiving unit 110. The interface processing unit 120 comprises: a detecting unit 121, for detecting whether MPEG TS data is carried in the received USB packets; a conversion unit 122, for unpackaging the USB packets loaded with MPEG TS data, or packaging the MPEG TS data to be transmitted into USB packets; and a multiplexing unit 125, for multiplexing conventional USB packets with the USB packets loaded with MPEG TS. The conversion unit 122 comprises an unpackaging unit 123 and a packaging unit 124.

When a host device is equipped with the UTI 10 of FIG. 1 and an external service module is also equipped with an interface whose mechanical and electrical characteristics match with those of the UTI of the host device, the host device and the external service module can carry out communication and data transport there between via the UTI 10. Here, a host device having the UTI 10 is taken just as an example, to describe the signal processing procedure of the UTI.

When the data streams to be sent from the host device via the UTI 10 is MPEG TS, the packaging unit 124 first segments the MPEG TS and then packages the segmented MPEG TS into data packets whose format accords with USB specification, i.e. encapsulating the MPEG TS data into the payload of the USB packets. To ensure data integrity, each MPEG TS packet loaded in the payload of the UBS packets must be unabridged, that is, a single MPEG TS packet cannot be crushed. Accordingly, the data field in a USB packet contain integer multiple of MPEG TS packets (N×188×8 bits (<8192)). FIG. 3 shows the structure of the payload in a USB packet loaded with MPEG TS packets, in which the Sync field has 32 bits, the PID (Packet ID) field has 8 bits, the Data field has N×188×8 bits and there are 16-bits for CRC. Bi-directional transport of MPEG TS may be implemented with two USB endpoints. Alternatively, the two endpoints may be used for high-speed unidirectional transport of MPEG TS as well, but the direction for one of the two endpoints changes so as to transfer data in one direction concurrently.

Figure 4:
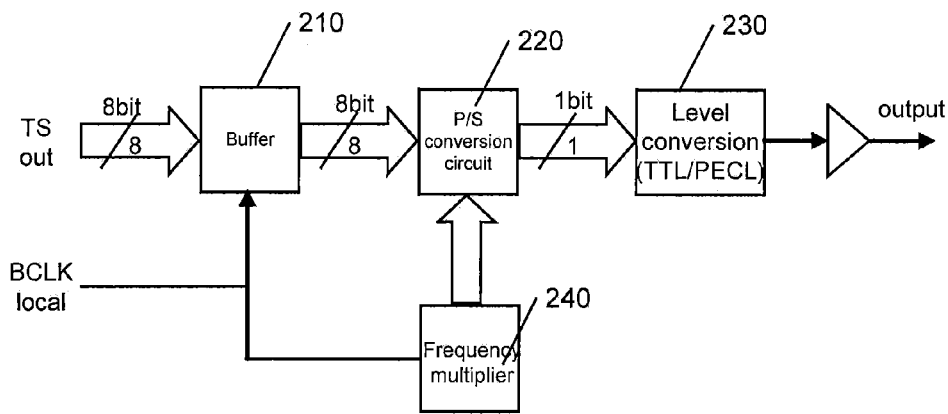
FIG. 4 is a block diagram showing a P/S (Parallel-to-Serial) conversion unit for converting parallel synchronous MPEG TS data into serial asynchronous USB data according to an embodiment of the invention.

Since the MPEG TS contains parallel synchronous signals and the data compliant with USB specification is transmitted in form of serial asynchronous signals, a P/S conversion unit is required during the packaging process, to convert the parallel synchronous signals into serial asynchronous signals, as shown in FIG. 4. With regard to the P/S conversion unit of FIG. 4, the parallel synchronous MPEG TS data to be transmitted is first stored in the buffer 210, which then outputs the TS data when driven by a local clock BCLK, and then processed by a P/S conversion circuit 220, whose serial clock is 8 or 10 multiple of the frequency of the local clock BCLK and is derived from the frequency multiplier 240, and serial asynchronous USB data streams can be output by an appropriate level conversion circuit 230.

The USB data streams carrying MPEG TS data, which is encapsulated in the packaging unit 124, may be multiplexed with other conventional USB packets in the multiplexing unit 125, and then sent to an external service module via the USB transceiving unit 110, thus realizing transmission operations of MPEG TS data via the UTI 10.

When the host device receives USB packets from the external service module via the USB transceiving unit 110, the data carried in the received USB packets is detected first in the detecting unit 121, to detect whether it contains the identification information indicating that MPEG TS data is carried in the USB packets. Upon detection of the identification information in the detecting unit 121, the unpackaging unit 123 unpackages the USB packets. Specifically, the unpackaging operation is to extract the MPEG TS data from the data field of the USB packets according to the data structure shown in FIG. 3.

Figure 5:
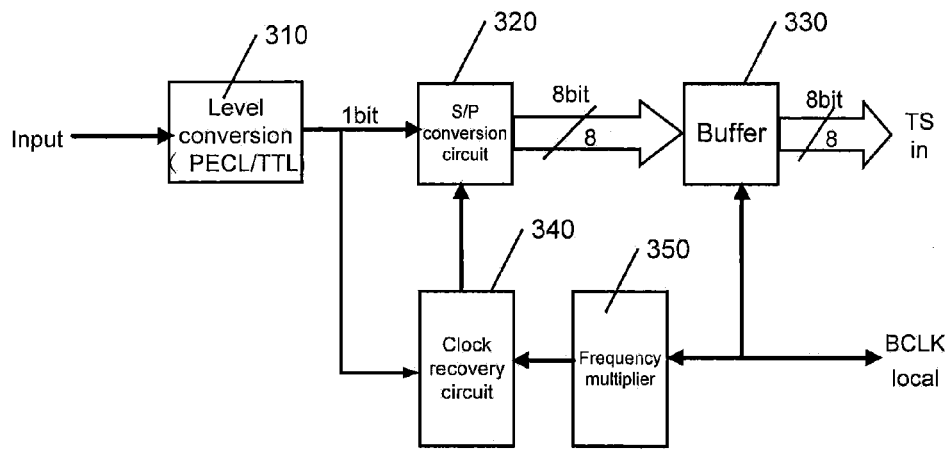
FIG. 5 is a block diagram showing a S/P (Serial-to-Parallel) conversion unit for converting serial asynchronous USB data into parallel synchronous MPEG TS data according to an embodiment of the invention.

Corresponding to the packaging process, a S/P conversion unit as shown in FIG. 5 is required in the unpackaging process to convert serial asynchronous signals into parallel synchronous signals, to obtain MPEG TS data streams. It may be seen from FIG. 5 that serial asynchronous USB data first passes through the level conversion circuit 310 and S/P conversion is done in the S/P conversion circuit 320, in which the clock generated by the frequency multiplier 350 for the local clock BCLK (8 or 10 multiple of clock) is phase-locked to the clock extracted from the input signals by clock recovery circuit 340, so as to obtain the clock to be used for the S/P version circuit 320. Next, the S/P converted data is stored in the buffer 330, which outputs parallel synchronous MPEG TS data when driven by the local clock BCLK.

If the detecting unit 121 fails to detect the identification information, it indicates that the USB packets are conventional USB packets and the UTI 10 feeds them directly into a subsequent unit for further processing.

It's to be note here that the data information transmitted via the UTI, i.e. MPEG TS data or USB data, may comprise service data, as well as control information for controlling a device equipped with the UTI, when the UTI is applied in a different environment. A detailed description will be given to the specific contents of the control information in the following embodiments.

The interrupt transfer in USB may be employed to transfer the control information. The control information data is transferred in the payload of the USB interrupt packets and the control information data has no special encapsulation format in itself. Since the transport of the control information is bidirectional, two endpoints are needed, one as the input and the other as the output. Alternatively, the control information may be transferred in way of bulk transfer similar to this method.

A detailed description is presented above to the architecture and signal processing procedure for a universal transport interface according to the invention, with reference to FIGS. 1 to 5. The host device equipped with the UTI 10 may be DTV receiver, STB (Set-Top Box), computer, entertainment system or multimedia server and the like. The external service module equipped with the UTI 10 may be a peripheral device, such as DTV CA receiving system module (abbreviated as CA module), HDD, digital recorder, digital camera or the like.

To better understand how the UTI of the invention operates in the host device and the external service module, a detailed description will be presented below to specific embodiments with reference to accompanying drawings. In the first embodiment, the host device is a DTV receiver, and the external service module is a CA module, whereas in the second embodiment, the host device is a DTV receiver and the external service module is a multimedia recorder.

The First Embodiment

Figure 6:
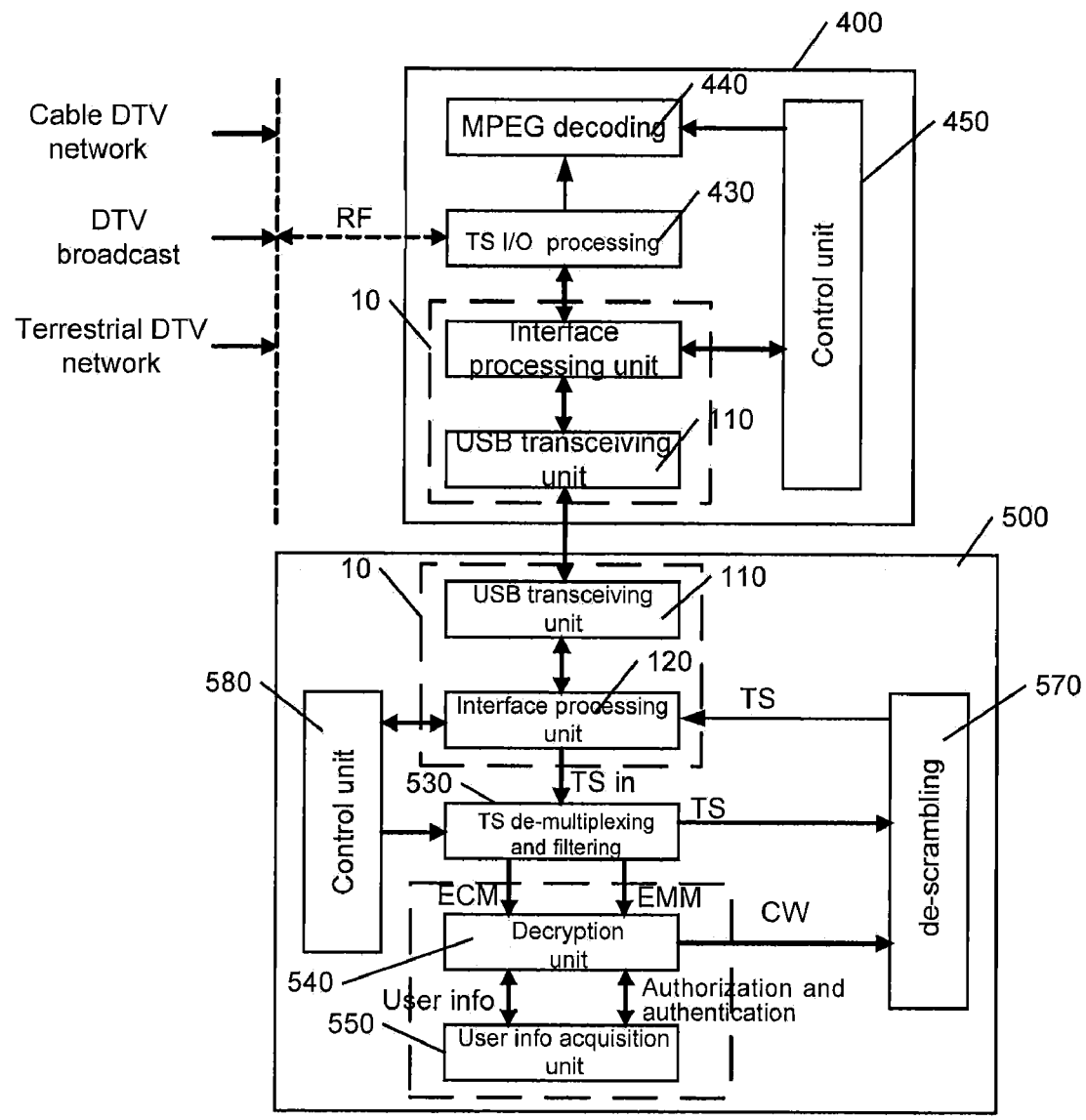
FIG. 6 is a block diagram showing a DTV receiver and an external CA module, both of which have the universal data transport interface according to an embodiment of the invention.

FIG. 6 is a block diagram showing a DTV receiver and a DTV CA module, both of which have Universal Transport Interface according to the first embodiment of the invention. As described above, CA techniques are used in DTV services to protect the interests of the authorized subscribers, that is, DTV signals for an entitled subscriber will be scrambled before transmission and the entitled subscriber will have to de-scramble the received signals by using his/her authorization information before viewing the desired program. In the present invention, to implement separation of service cards from devices, de-scrambling of the MPEG TS is performed in a CA module 500 external to the DTV receiver 400, and transport of MPEG TS between the DTV receiver 400 and the CA module 500 is done via the UTI 10.

As shown in FIG. 6, both the DTV receiver 400 and the DTV CA module 500 have UTI 10 of FIG. 1, and the two UTIs 10 match with each other.

Figure 7:
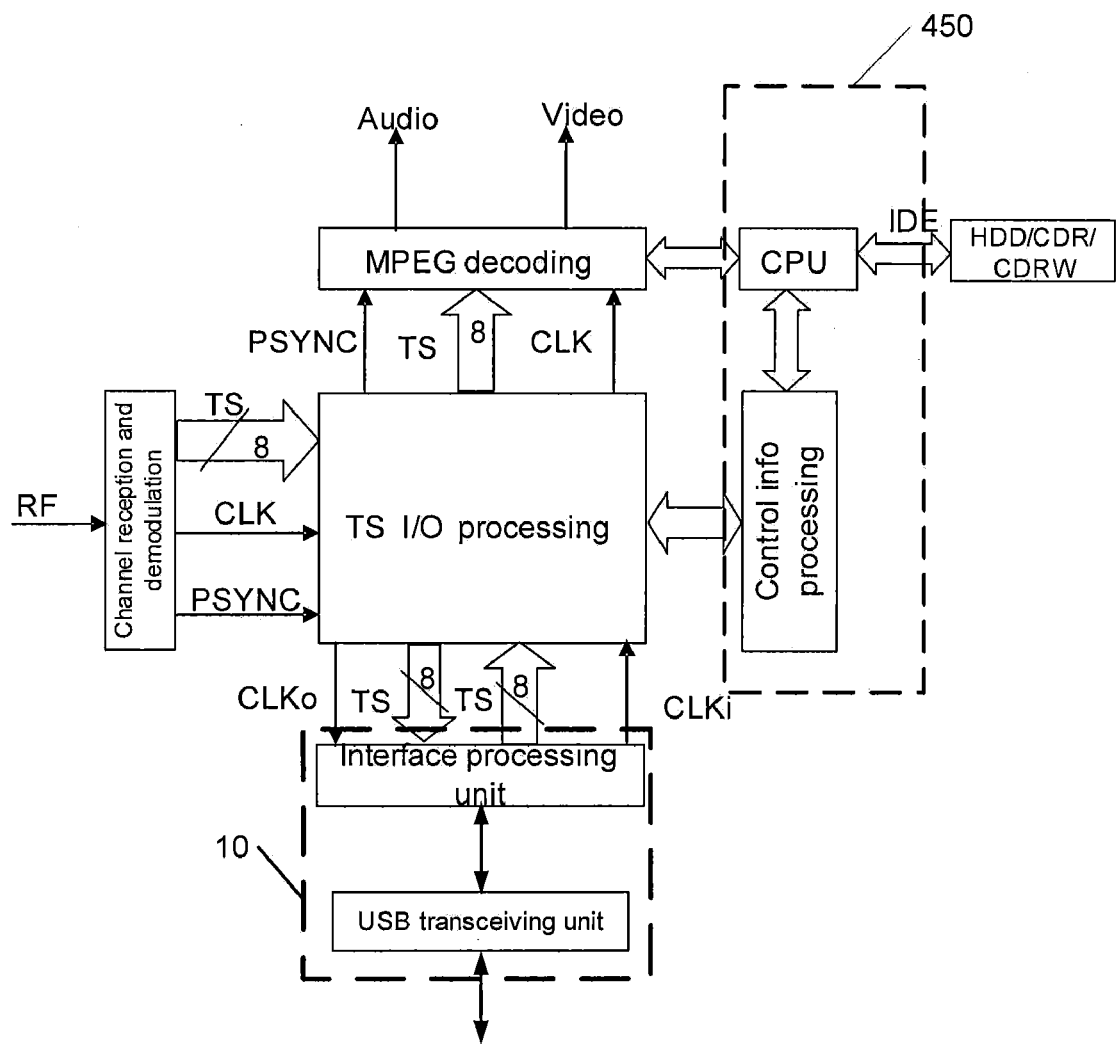
FIG. 7 is a detailed block diagram showing a DTV receiver having the universal data transport interface of the invention.

In addition to the UTI 10, the DTV receiver 400 further comprises a RF (radio frequency) tuner for receiving DTV broadcast signals or DTV signals from terrestrial DTV networks, alternatively the DTV receiver 400 may receive signals from cable DTV networks through cables; a TS I/O processing unit 430, for transporting the MPEG TS received by the RF tuner to the CA module via the UTI 10 or sending the received MPEG TS to other processing units; a MPEG decoding unit 440, for decoding the original or de-scrambled MPEG TS from the TS I/O processing unit 430, to obtain video and/or video signals to be displayed or played by a playback unit (not shown here); and a control unit 450, for extracting control information from the data received via the UTI 10, to control operations of the MPEG decoding unit 440 and the playback unit, or generating control information to be sent to the CA module 500 via the UTI 10. FIG. 7 shows the architecture of the DTV receiver 400 and the signal flow between the modules.

Figure 8:
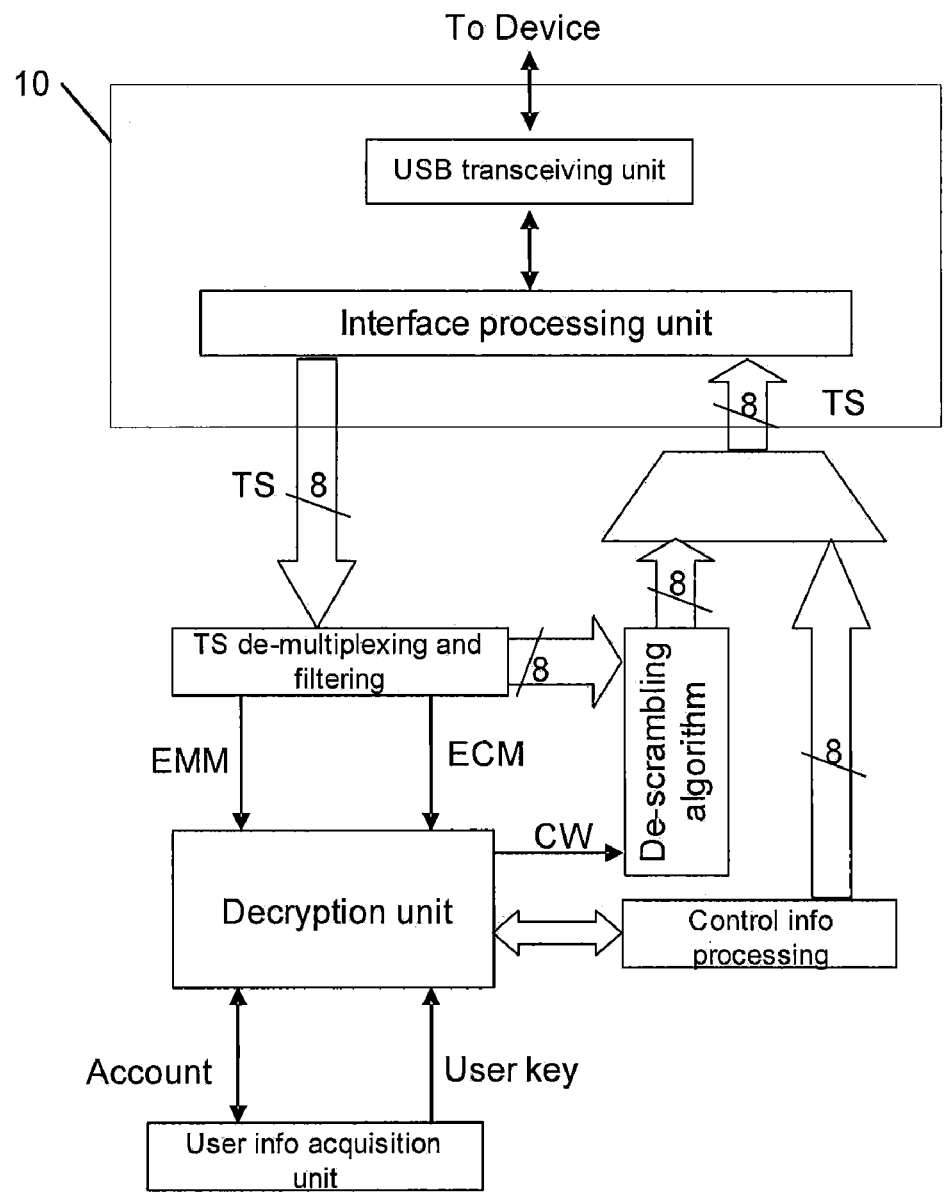
FIG. 8 is a detailed block diagram showing an external CA module having the universal data transport interface of the invention.

As shown in FIG. 6, in addition to a UTI 10 matching with that of the DTV receiver 400, the CA module 500 further comprises a TS de-multiplexing and filtering unit 530, for de-multiplexing and filtering the received MPEG TS; a decryption unit 540, for obtaining a decryption CW (Control Word) to be used for de-scrambling; a user information acquisition unit 550, for obtaining a user key; a de-scrambling unit 570, for de-scrambling the filtered MPEG TS of a single program according to the CW; and a control unit 580, for controlling operations of the de-multiplexing and filtering unit according to the control information received via the UTI 10. FIG. 8 shows the architecture of the CA module 500 and the signal flow between the modules. Alternatively, the decryption unit 540 and the user information acquisition unit 550 may be external to the CA module 500, i.e. a smart card for obtaining CW to be provided to the CA module.

The basic architectures of the DTV receiver 400 and the CA module 500 are explained above. Detailed description will be given below with reference to FIG. 6 to the whole procedure for de-scrambling the signals of a user-desired program in case of separation of the service card from the device.

It can be seen from FIG. 6 that the DTV receiver 400 (i.e. the device side) having the UTI 10 first receives MPEG TS from an external network (for example, a terrestrial DTV network) via the RF tuner, wherein the MPEG TS data streams may comprise original MPEG TS or the MPEG TS scrambled by the CA system. Further, the scrambled MPEG TS further comprises EMM (Entitlement Management Messages), ECM (Entitlement Control Messages) and so on.

After acquisition of the MPEG TS, if the received MPEG TS has not been scrambled by the CA system, the TS needn't be sent to the CA module 500 for processing, instead the MPEG TS is sent directly via the TS I/O processing unit 430 to the MPEG decoding unit 440 for decoding, to obtain the decoded audio and/or video signals, which may be displayed or played in the playback unit.

If the obtained MPEG TS has been scrambled by the CA system, the MPEG TS will be sent to the CA module 500 for descrambling under the control of the control unit 450. The scrambled MPEG TS is encapsulated into USB packets payload having the MPEG TS in the packaging unit 124 of the interface processing unit 120, and conversion from parallel synchronous signals to serial asynchronous signals is performed on these USB packets in the P/S conversion unit, and then the converted signals are sent to the CA module 500 via the USB transceiving unit 110.

As shown in FIG. 6, the CA module 500 receives the scrambled MPEG TS from the DTV receiver 400 via the UTI 10. First, the detecting unit of the interface processing unit 120 detects that the USB packets received via the USB transceiving unit 110 carry MPEG TS data, the unpackaging unit 123 unpackages the USB packets and extracts the MPEG TS data therefrom and S/P conversion is performed, and then the extracted scrambled MPEG TS is sent to the TS de-multiplexing and filtering unit 530.

The TS de-multiplexing and filtering unit 530 implements extraction of specific service information PSI/SI section and de-multiplexing of TS data streams, and filters out the MPEG TS of the desired program, as well as obtains the related PSI/SI including EMM and ECM from the TS. Then, the CA module 500 obtains the user key from the user information acquisition unit 550 and the decryption unit 540 decrypts the EMM and ECM by using the obtained user key, to obtain the de-scrambling CW. In the last, the de-scrambling unit 570 performs de-scrambling operation on the MPEG TS of the selected program by using the CW.

After P/S processing in the interface processing unit 120 of the UTI 10, the de-scrambled MPEG TS data is packaged into USB packets and sent back to the DTV receiver 400 via the USB transceiving unit 110 in real time or in non-real time.

After the DTV receiver 400 receives the de-scrambled MPEG TS via the UTI 10 according to the above method, the TS I/O processing unit 430 transmits the de-scrambled MPEG TS to the MPEG decoding unit 440. The MPEG decoding unit 440 decodes the MPEG TS, outputs the decoded audio and video signals to the playback unit for displaying and/or playing, such that the subscriber may view and/or listen to the desired TV program.

To ensure the above procedure of de-scrambling the MPEG TS to be completed successfully by using an external CA module, transfer of control information is necessary. Here, the control information is used to implement interoperability between the DTV receiver and the DTV CA module, including, but not limited to PnP of the CA module, resource management and allocation, definition of message display format, setting of communication rate and other control functions.

Figure 9:
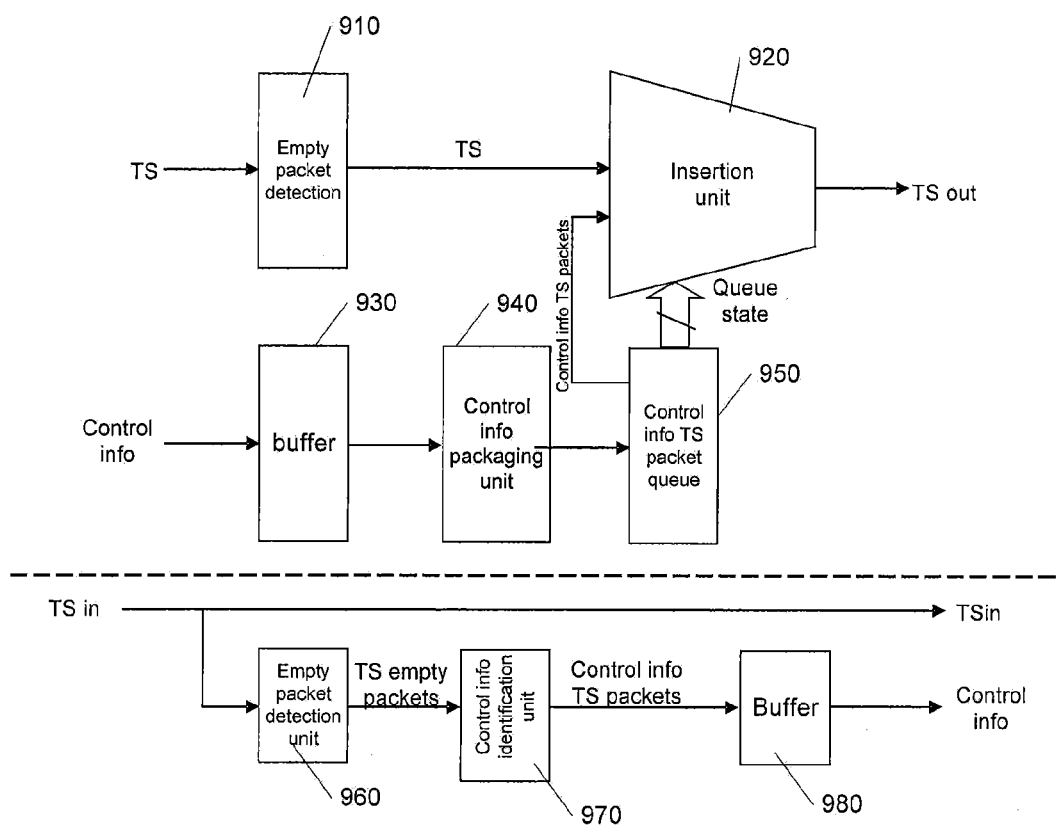
FIG. 9 shows the structure of the control information processing unit in the present embodiment of the invention.

As described above, the control information may be transferred in any transfer mode of interrupt transfer or bulk transfer as defined in the USB specification, or inserted into an empty MPEG TS packet for transmission. FIG. 9 is a block diagram showing a control information processing unit for transferring control information in an empty MPEG TS packet. Empty TS packets are often filtered out in decoding the MPEG TS or data de-scrambling and thus won't impact on the data streams, so a MPEG TS packet containing control information may be inserted into an empty TS packet position in the MPEG TS in way of substituting the empty packet. As shown in FIG. 9, on one hand, when control information is to be sent, it is stored in the buffer 930 and then control information packaging unit 940 performs MPEG TS packaging on the control information and inserts an identifier for the control information, to form a control information TS packet. Next, the control information TS packet is sent into the control information TS packet queue 950. When the queue is not empty, if the MPEG TS empty packet detection unit 910 detects that the current TS packet is an empty packet, the insertion unit 920 replaces the TS empty packet in the original TS with a control information TS packet in the control information TS packet queue 950, and thus the control information is inserted into the MPEG TS for transmission. On the other hand, when detecting the received MPEG TS, the empty packet detection unit 960 detects whether there is an empty MPEG TS packet while TS data is in transmission. When there is an empty TS packet, the control information identification unit 970 detects whether the TS empty packet contains the control information identifier. If the TS empty packet is a control information TS packet, it will be stored in the buffer 980 and the control information is extracted so that the control unit (450, 580) in the DTV receiver or the CA module performs the corresponding operation according to the command in the control information.

The control information may also employ the MPEG DSM-CC protocol or the related protocols for the command interface in EN50221 (DVB-CI). The specific procedure may be referred to the related protocols and the description is omitted herein.

As shown in FIG. 6, in addition to management of the MPEG TS decoding system, the control unit 450 in the DTV receiver (to be performed by a CPU) is also responsible for processing the control information and other operations. Similarly, there is a control unit 580 in the DTV CA module (to be performed by a CPU), and the control unit is responsible for processing the control information between it and the DTV receiver and other corresponding operations.

Figure 10:
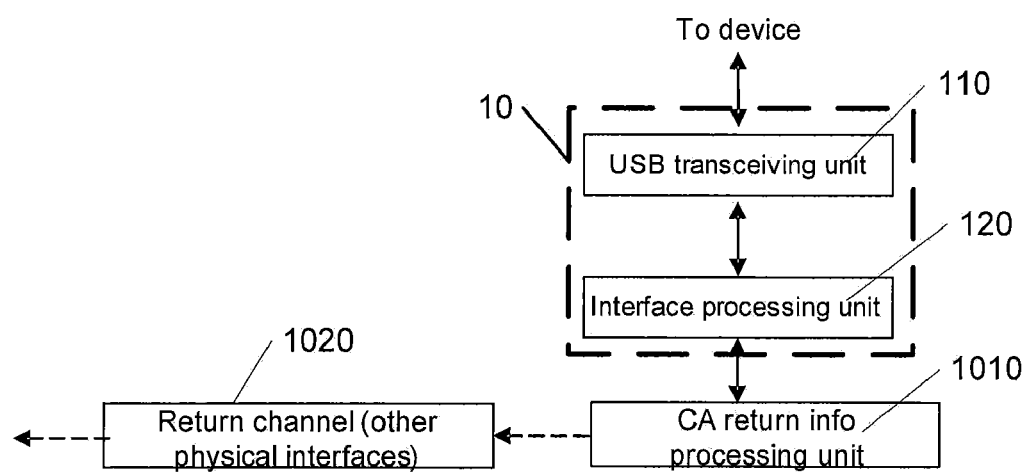
FIG. 10 shows the structure of an external CA module having a return channel according to an embodiment of the invention.

The basic architecture of the CA module is given above, and the CA module may also have a return channel, as shown in FIG. 10. In FIG. 10, in addition to components same as those in FIG. 6 (not shown), the CA module further comprises a return information processing unit 1010 and a return channel 1020. It may be seen from FIG. 10 that the return information processing unit 1010 is used for processing related authorization and authentication information to be returned to the service provider, or related information determined by the user, to be returned to the service provider. The return information may be transferred to the DTV receiver 400 via the UTI 10 and then sent to the service provider via the return channel of the DTV receiver 400 (for example, via a transmission RF unit). Alternatively, the CA module itself may send the authorization and authentication information to the service provider via a return channel thereof (for example, via a RF signal transmission unit).

Figure 11:
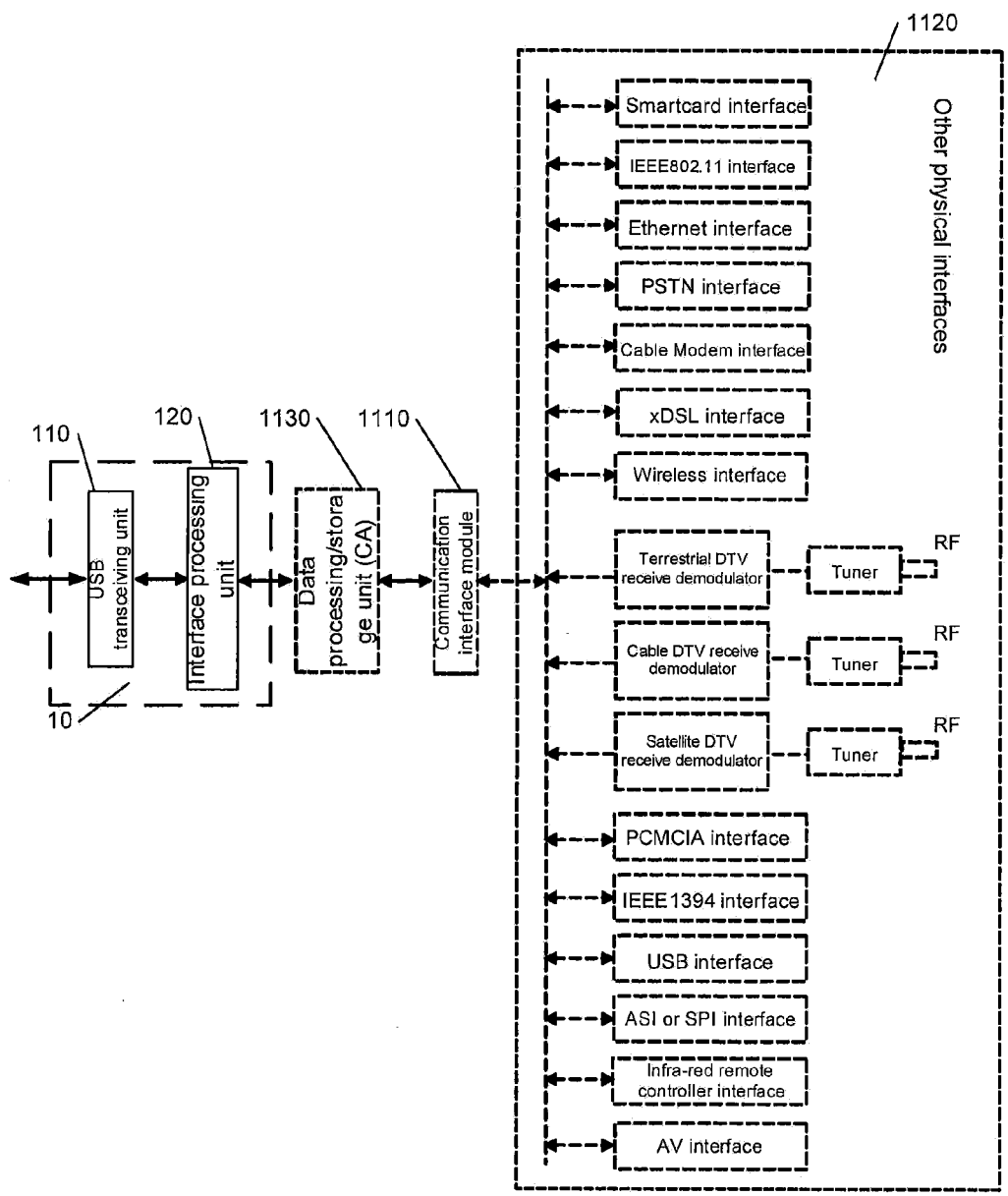
FIG. 11 shows an external service module having other communication interfaces according to the present embodiment of the invention.

FIG. 11 shows another CA module, which may be connected to various communication interfaces. In addition to the components shown in FIG. 6, the CA module of FIG. 11 may further comprise one or more interface units 1120 for connecting to other devices and a communication interface module 1110 communicating with them. In FIG. 11, the data processing/storage unit 1130 comprises all parts other than the UTI 10 and the user information acquisition unit 550 in FIG. 6. The communication interface module 1110 is used to convert the de-scrambled signals or control information from the CA module into data which accords with a particular interface protocol and send them via a corresponding interface, or convert the format of the information received by the interface unit 1120 into the format of information available for the data processing/storage unit 1130. The interface unit 1120 may comprise interfaces for Ethernet, PSTN, Cable Modem, XDSL, LAN (IEEE 802.11x), WPAN (Wireless Personal Area Network), or terrestrial/cable/satellite DTV RF interface, and/or universal data interface, such as USB, IEEE 1394, RS 232-C, PCMCIA, PCI, ASI, SPI, SM, CF, SmartCard (ISO 7816), infrared remote control interface and/or digital or analog AV interface and so on.

Figure 12:
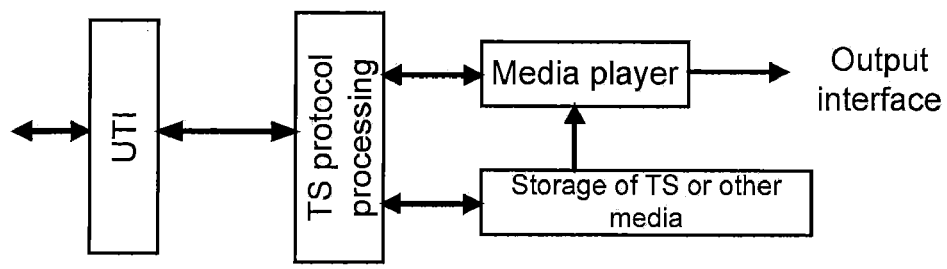
FIG. 12 shows an external service module for storing and playing TS data according to the present embodiment of the invention.

DTV receivers and CA modules for de-scrambling are taken as example above to describe how the universal transport interface of the invention is applied to implement separation of service cards from devices for DTV. The invention allows separation of the CA function from the DTV receiver. For manufacturers of DTV sets and STBs, this reduces R&D cost and lifecycle, decreases production and marketing cost, and facilitates the mass production of DTV. For DTV subscribers, this endows them with free selection of DTV and services, and prolongs the lifecycle of the DTV receivers. Compared with other solutions, it has advantages such as low cost, high performance and so on. However, the UTI 10 according to the invention is not limited to separation of service cards from devices. The external service module may be not only a CA module, but also a data processing and/or storage unit for storing, processing and playing MPEG TS, which is equipped with a UTI as shown in FIG. 12. Furthermore, the external service module may be another conventional device with USB interface, e.g. when these devices are used, the data stored in the HDD may be displayed or played on the DTV set.

The Second Embodiment

Figure 13:
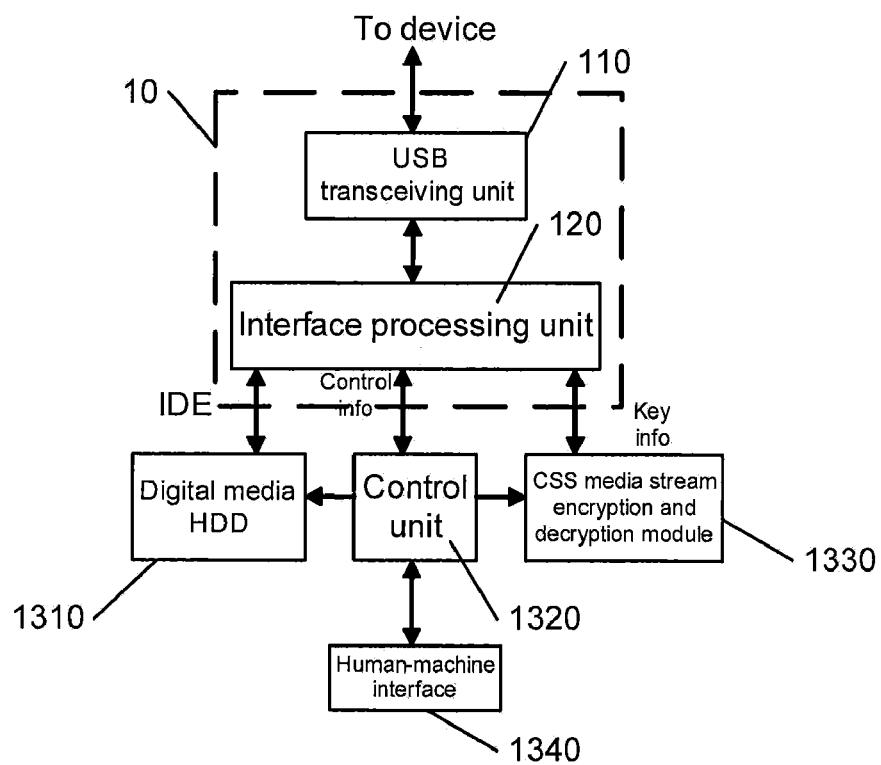
FIG. 13 is a block diagram in which the external service module is a digital media recorder.

FIG. 13 shows the architecture of a portable digital media recorder having the universal transport interface of the invention.

As shown in FIG. 13, the portable digital media recorder comprises a UTI 10, a digital media disk HDD 1310, a CPU control unit 1320, a CSS media stream encryption/decryption module 1330 and a human-machine interface 1340 and so on.

In this embodiment, the portable digital media recorder is used as an external service module, and is connected to the device side (a DTV receiver or STB or computer) via the UTI 10. For example, when the portable digital media recorder is in recording mode, it is connected to the DTV receiver via the UTI 10 and receives digital TS media streams to be stored (including digital audio and video in form of MPEG-2, MPEG-4, MP3 and TS in other formats). After encryption by the CSS media stream encryption/decryption module 1330 (for purpose of anti-piracy), they are converted into data format for IDE interface and stored into the digital media disk 1310 in order of programs and time. Conversely, when the digital media recorder is in play mode, it may be connected to a computer via the UTI 10. When the above digital TS media streams are to be played, after searching according to the program list and time sequence, the IDE data decrypted by the CSS media stream encryption/decryption module 1330 is converted back into TS format and the TS data streams are transferred to the computer via the UTI 10 so that the processing unit of the computer converts them into an acceptable format for playing. The control unit 1320 is used to process control information between it and the device side and the host computer, such as program location, time statistics, index, subtitle and fast/slow forward and backward. The control unit 1320 is further connected with the human-machine interface 1340, which receives command information from a user and performs the corresponding operations according to the command. The human-machine interface may comprise various functional buttons (for example, store, play, fast/slow forward or backward, index, power, lock and so on) and infrared remote control sensor, various indicators and etc.

The Third Embodiment

Figure 14:
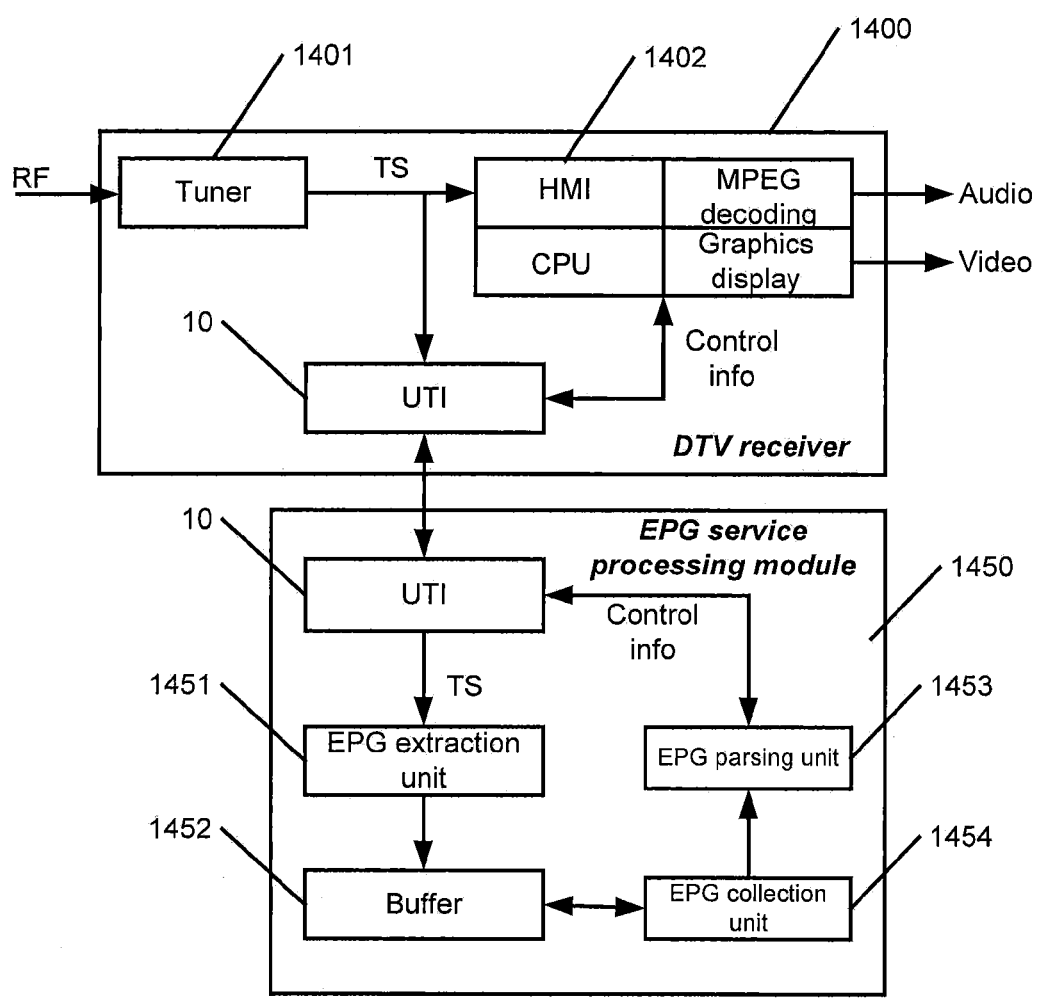
FIG. 14 shows a DTV EPG (Electronic Program Guide) system based on the UTI according to the present embodiment of the invention.

FIG. 14 shows a DTV EPG (Electronic Program Guide) system based on the UTI according to the embodiment of the invention. As shown in FIG. 14, the processing platform for the EPG system comprises a DTV receiver 1400 equipped with the UTI 10 and an EPG service processing module 1450 having a matching UTI. In FIG. 14, the DTV receiver 1400 receives MPEG TS data containing EPG information via the tuner 1401 and then sends the MPEG TS data to the EPG service processing module 1450 via the UTI 10.

Upon receipt of the MPEG TS containing EGP via the UTI 10, the EPG service processing module 1450 sends it to the EPG extraction unit 1451 to filter sections of MPEG PSI and DVB SI data, or extract EPG broadcasting MPEG TS packets with a particular PID. The EPG information extraction unit 1451 may be implemented with the TS reception processing logic or CPU software in the module. Next, the extracted EPG information is kept in a particular buffer 1452, and then a corresponding software is run in the EPG collection unit 1454 to recover the payload in the packets into MPEG PSI and DVB SI data or EPG broadcasting, such as HTML/XML, JAVA or texts in other formats. Finally, the EPG parsing unit 1453 performs software parsing on the MPEG PSI and DVB SI data or EPG broadcasting, such as HTML/XML, JAVA or texts in other formats colleted by the EPG collection unit 1454, to obtain the program list information and current program information.

Information about the program list is classified into abstract information and detailed information. The abstract information comprises the number of days for transferring information, the number and names of transfer channels, the number of programs to be transferred, the identifier and the name of the program provider, information about the transfer network (network identifier and network name). The detailed information comprises the name of the program, brief introduction to the program, such as text, still images, video clips or the like, the program, the start and end time of the program, the topic of the program, the class of the program, the rating restriction of the program, and image or video advertisements issued through EPG. Information about the currently played program comprises the current time, the name of the current program, the name of its channel, the type of the program, the subsequent program and so on. Program classification guide information is made into index here. The EPG information is parsed into display information and execution information data, both of which are sent to the DTV receiver via the UTI 10 as control information, to command the DVT receiver to display the EPG information and perform corresponding operations.

When new EPG information is received or the DTV receiver 1400 requests the data information required by the current input focus, the EPG service processing module 1450 issues a display update request to the receiver, and then sends the display content and display format as control information to the DTV receiver 1400. On receipt of the control information via the UTI, the DTV receiver 1400 performs data processing and operations in the processing unit 1402. The processing unit 1402 comprises a MPEG decoding part for decoding the audio and/or video, a graphics display part for displaying graphics elements, a human-machine interface (HMI) for receiving user commands, and a CPU for controlling the above three parts.

With regard to the control information received by the processing unit 1402, the display content and format can be classified into three levels. The first level only comprises display content, location, size, color and so on. Based on the first level, the second level further comprises definition of the required graphics elements, such as button, text box, check button, component container and so on, the generation and display of which are to be performed by the graphics display part in the processing unit 1402. The third level is the control information for sending the display content and format as graphics data of a whole screen or a sub-area to the DTV receiver, such that the receiver may display without generating graphics elements, which is particularly suitable for HTML/XML, JAVA or data in other formats, to be parsed by the engine for HTML/XML and JAVA in the module. At the receiver side, the EPG information is displayed by overlapping the background layer and the OSD (On-screen Display) layer of its graphics.

On receipt of a user operation or a predefined command, the human-machine interface part of the processing unit 1402 retrieves the database of the local program information. If the execution data information required by the current input focus is found, it will enter into the corresponding state transition and perform software and hardware operation; otherwise, it will request the module to provide the execution data information required by the current input focus, then perform corresponding state transition and software and hardware operation and update the local program information database.

With the distributed EPG system shown in FIG. 14, EPG information processing may be separated from the DTV receiver, which simplifies the development tasks for DTV receivers, facilitates mass production, makes it possible to provide diversified and individualized services of EPG information broadcast and enables integration of EPG with other services, such as conditional access and value-added services.

The Fourth Embodiment

Figure 15:
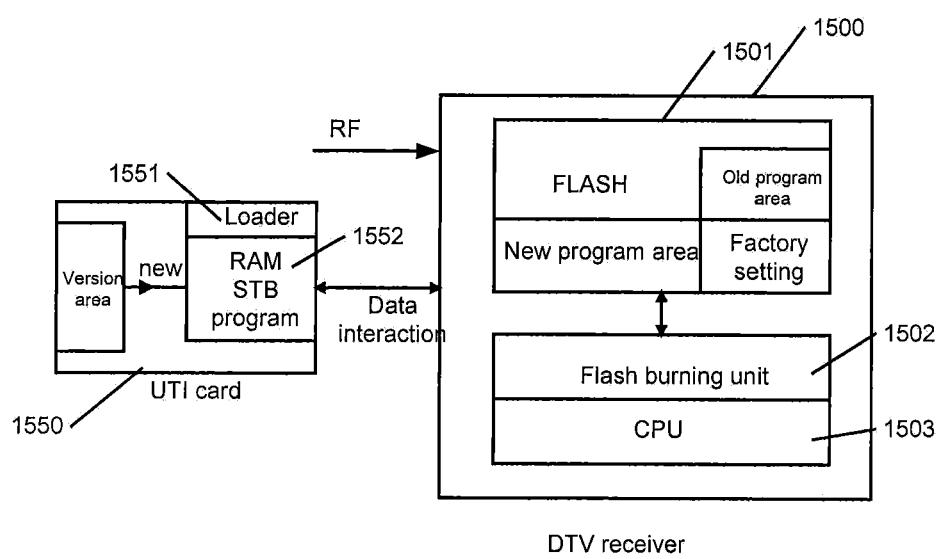
FIG. 15 shows a DTV software update system based on the UTI (Universal Transport Interface) according to the present embodiment of the invention.

FIG. 15 shows a DTV software update system based on the UTI according to the invention. The processing platform for the system comprises a DTV receiver 1500 equipped with the UTI and a UTI card 1550 having software download function. The main characteristics lie in that the software loader is integrated on the UTI card, which obtains the version information of the software to be updated, parses and extracts the software data in the TS and implements software update on itself and the DTV receiver. As shown in FIG. 15, the UTI card 1550 and the DTV receiver 1500 store their version information into their respective FLASH. When the UTI card 1550 is connected to the DTV receiver 1500, the UTI card 1550 will store the version information of the DTV receiver 1500 read via the UTI and its own version information in RAM 1552 of the UTI card 1550. Then, the DTV receiver 1500 sends the TS loaded with software update code received by the front end (RF unit) to the UTI card 1550 via the UTI. The code stream for software update is encapsulated with Data Carousel protocols. The UTI card 1550 parses the TS according to Data Carousel protocols, for information about the authorization from the software provider and the software version. To distinguish different software provided from different software developers, an OUI (Organization Unique Identifier) is used in the Data Carousel to identify each provider, wherein the selector byte in the OUI is used to distinguish different products provided from the same provider. The UTI card 1550 searches for its appropriate software code stream according to this field. The UTI card 1550 compares the version information for the current software stored in the RAM 1552 and the software version information in the TS. If a new version is found, the loader 1551 downloads the required software. Here, to guarantee the correctness for the received program, each packet of the software data has a CRC field.

After data reception is finished, if it is the program of the UTI card 1550, the UTI card 1550 will start a FLASH burner, and store the downloaded program into the FLASH of the UTI card 1550. If it is the program of the DTV receiver 1500, the UTI 1550 transfers the software data in the RAM 1552 to the DTV receiver 1500. After the DTV receiver 1500 receives the software data, the FLASH burning unit 1502 will burn the download program into the FLASH and label it as new under the control of CPU 1503. It may be seen from FIG. 15 that the FLASH area in the DTV receiver 1500 has three areas. The first is factory setting, in which the original program is stored, having the basic software update and start functions. If the DTV receiver has a serious problem, recovery may be done by returning to the factory setting. The second is new program area, which is labeled as new after the downloaded program of the new version is burnt into the FLASH. The third is the old program area. When a new version program is burnt into the FLASH, the original program area is labeled as old. Each restart begins from the new area, and if fails it will begin from the old program area, and the new and old program areas will be labeled again.

In this embodiment, the DTV software update system provides to the DTV receiver via the UTI a UTI card, which may update software online and the online update is implemented by separation of the card from the device, so it's easy and flexible for user to update software.

The Fifth Embodiment

Figure 16:
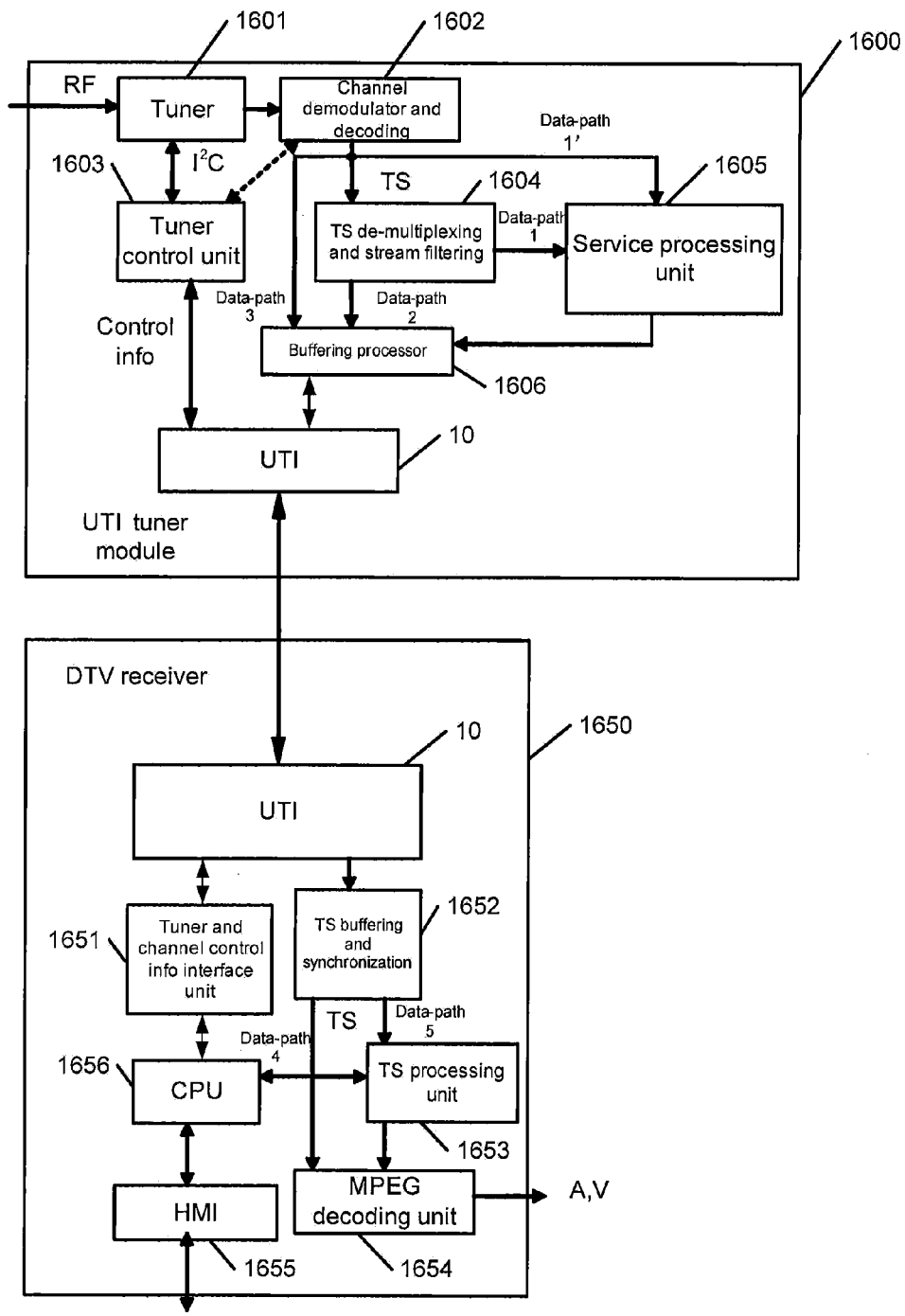
FIG. 16 shows a DTV tuner based on the UTI according to the present embodiment of the invention and its corresponding DTV receiver.

FIG. 16 illustrates a DTV tuner (high frequency head) application based on the UTI of the invention. The processing platform may comprise a tuner module 1600 having the UTI and a DTV receiver 1650 having a matched UTI (for example, DTV set, STB, PC, PDA, various display or storage devices having MPEG decoding function). The DTV RF signals, which are modulated and channel coded, are received and converted at the UTI tuner module 1600, sent to the DTV receiver 1650 via the UTI 10, and then converted into TS signals in the DTV receiver 1650 and decoded into audio/video signals. Control information for such as DTV channel, program, channel demodulation and decoding, is converted into USB data at the DTV receiver 1650 and transferred to the UTI DTV tuner module 1600 via the UTI 10, to control the tuner and the channel demodulator and decoder.

As shown in FIG. 16, the UTI tuner module 1600 comprises a tuner 1601, a channel demodulator and decoder 1602, a tuner control unit 1603, a TS de-multiplexing and stream filtering unit 1604 (optional), a service processing unit 1605 (optional), which may comprise CA or/and EPG or/and loader or/and other application processing units, a buffering processor 1606 and a UTI 10. The RF DTV signals, which are modulated and channel coded, are converted at the tuner 1601 into IF or baseband signals, and then converted into TS signals by the channel demodulator and decoder 1602. The TS signals may be transferred to the buffering processor 1606 via data-path 1 (or 1') or data-path 2 or data-path 3, and data transport may be conducted with the DTV receiver 1650 via the UTI 10. The TS signals may be sent via data-path 1 after being processed at the TS de-multiplexing and stream filtering unit 1604, or data-path 1', to the service processing unit 1605 to be processed into TS(s) of a single program or several programs as selected by the user, and then sent to the buffering processor 1606. Alternatively, after being processed at the TS de-multiplexing and stream filtering unit 1604, the TS may be sent to the buffering processor 1606 via data-path 2. Still alternatively, the TS signals may be sent to the buffering processor 1606 directly via a straightforward data-path 3. The UTI 10 packages the TS data into USB data structure (in USB synchronous or bulk mode). The control information for the tuner and the channel demodulator and decoder from the DTV receiver 1650 is processed at the UTI 10 of the UTI tuner module 1600, extracted from the USB data structure (in synchronous, or bulk, or interrupt mode) and converted into control commands to be sent to the tuner control unit 1603. The tuner control unit 1603 converts the control commands into data in format of $I^2C$ and sets them to the tuner 1601 and the channel demodulator and decoder 1602, where the control information to be transferred to the channel demodulator and decoder 1602 may be transferred directly or transferred via the tuner 1601. The packaged compounded USB data streams are communicated to the DTV receiver 1650 via the UTI 10.

The DTV receiver 1650 comprises a UTI 10, a tuner and channel control information interface unit 1651, a CPU 1656, a TS buffering and synchronization processing unit 1652, a TS processing unit 1653, a MPEG decoding unit 1654, and a human-machine interface 1655. The combined USB data streams pass the UTI 10 and TS is extracted from the USB data streams at the UTI 10. The extracted TS is sent to the TS stream buffering and synchronization processing unit 1652 via data-path 5 to buffer and synchronize the TS, and then sent to the MPEG decoding unit 1654 for source decoding, or the extracted TS is sent to MPEG decoding unit 1654 via data-path 4 directly. data-path 4 is straightforward. Via the data-path 5, TS stream processing unit 1653 (for example, a TS de-multiplexing unit and a CA processing unit) performs CA de-scrambling or/and related processing of EPG or/and loader or/and other applications. CPU 1656 sends the channel and tuner control information from the human-machine interface 1655 to the tuner and channel control information interface unit 1651, and then sends it to the UTI tuner module 1600 via the UTI 10. The channel and tuner control information is processed at the UTI tuner module, to control the tuner 1601 so as to select a corresponding RF channel according to the user requirement.

The invention enables separation of the tuner from the DTV receiver, such that users needn't buy multiple STBs to receive DTV signals from different (terrestrial, satellite, cable, wireless and so on) networks and the DTV manufacturers need not install several built-in tuners. To receive DTV programs, a user only needs to insert a corresponding tuner module. Furthermore, a module may be used to connect to different DTV receivers, or connect to computers, PDAs, mobile phones, USB memories, USB displays, which is easy for use and reduces cost. This solution also simplifies applications, such as the CA and EPG, without bidirectional transport of TS between the UTI module and the DTV receiver, and thus the cost may be reduced. For DTV programs of standard resolution, USB 1.1 is enough for the receiver and the module and USB 2.0 high-speed interface is not necessary.

Detailed descriptions are given above to various devices and external service modules having the UTI 10 of the invention. But the application environment for the UTI according to the invention is not limited hereto.

Figure 17:
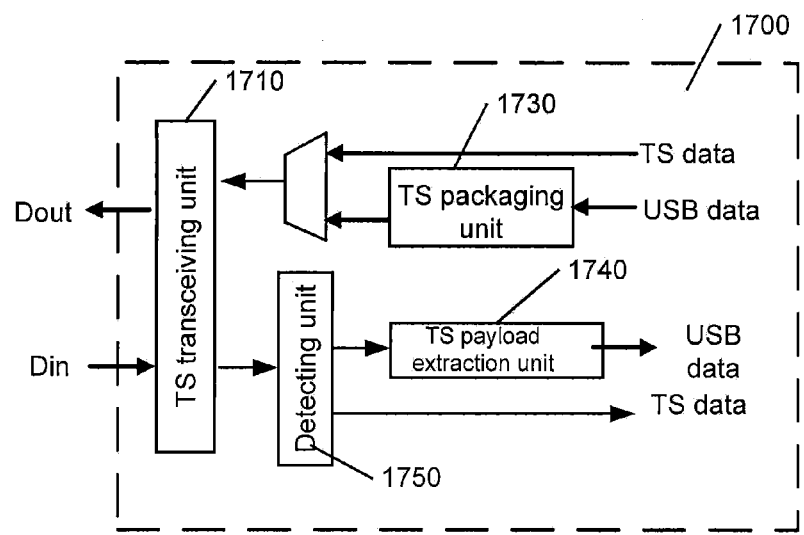
FIG. 17 shows a MPEG TS transport interface according to an embodiment of the invention.
Figure 18:
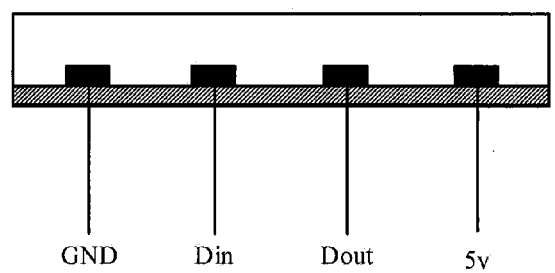
FIG. 18 shows the electrical definition of the specific TS transceiving unit in the MPEG TS transport interface.
Figures 19, 20:
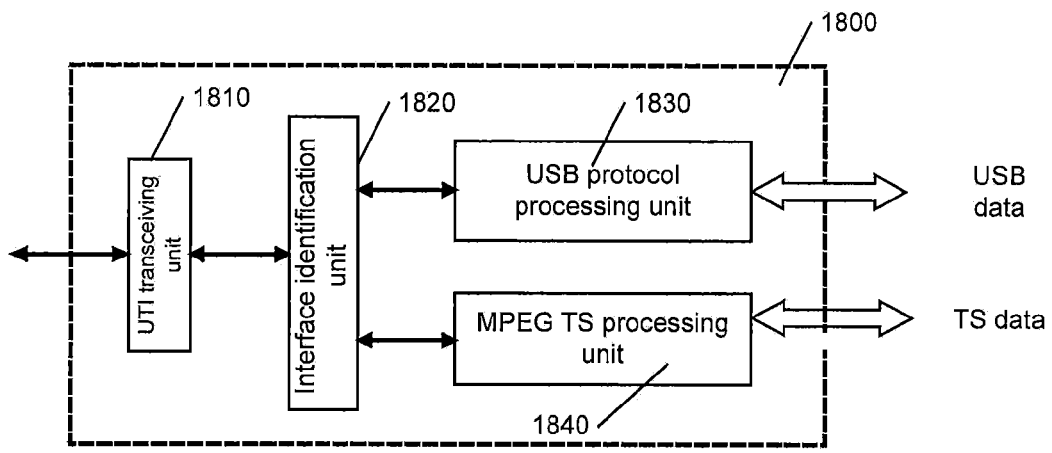
FIG. 19 shows the data structure for encapsulating the data that accords with USB specification into the data that accords with MPEG TS specification according to an embodiment of the invention.
FIG. 20 is a block diagram showing a universal data transport interface supporting the two electrical interface connections.

In addition to the above universal transport interface UTI 10 constructed on the basis of the USB specification, the invention further provides another self-defined MPEG TS data transport interface 1700, as shown in FIG. 17. It may be seen from FIG. 17 that the MPEG TS data transport interface 1700 comprises a TS transceiving unit 1710 for transmitting and receiving MPEG TS data, the mechanical structure of which accords with the USB interface specification. The electrical characteristics of the TS transceiving unit are shown in FIG. 18. In FIG. 18, the power source line and the ground line are same as those in USB, and two independent input signal $D_{in}$ and output signal $D_{out}$ are used for transport the data. This TS transceiving unit is more suitable for bidirectional transport of MPEG TS. The transport interface 1700 employs MEPG TS protocols for transport. When TS data is to be transmitted via the transport interface 1700, parallel TS signals are converted into serial signals (not shown here), and then sent via the TS transceiving unit 1710. When the TS transceiving unit 1710 receives serial TS data, conversion from serial signals to parallel signals is made accordingly. If the data to be transmitted via the transport interface 1700 is a USB data stream, the TS packaging unit 1730 packages the USB packets to be transmitted as the payload of the MPEG TS into the TS packets, and the data structure is shown in FIG. 19. PID of a TS packet containing USB data refers to the reserved definition of MPEG as its unique identifier. Thus, the detecting unit 1750 detects the PID of the data received by the TS transceiving unit 1710. If a unique PID representing USB data is found, the TS payload extraction unit 1740 extracts the USB data.

FIG. 20 shows a transport interface 1800 according to the invention, which is compatible with the self-defined TS transceiving unit shown in FIG. 18 and the USB transceiving unit shown in FIG. 2. The transport interface 1800 comprises a UTI transceiving unit 1810 for receiving and sending signals, whose mechanical structure is compatible with the USB specification and electrical characteristics are compatible with those of the self-defined TS transceiving unit and the USB transceiving unit, an interface protocol identification unit 1820, coupled to the UTI transceiving unit 1810, for identifying whether the connected interface is a USB interface or a self-defined TS interface, a USB data protocol processing unit 1830, for processing USB data, and a MPEG TS protocol processing unit 1840, for processing MPEG TS data.

In the transport interface 1800, the interface identification unit 1820 identifies which kind of electrical interface is used by the external service module. The identification operation may be implemented with hardware or software.

The interface identification unit 1820 can use mechanical technique to identify the type of the electrical characteristics of the interface, that is, to add a contact or switch to the interface receptacle at the device side, in the case of ensuring that an ordinary USB plug can be inserted correctly without touching the contact or switch. Accordingly, a matching contact or a pin that can press the switch is added to the plug at the external service module, which is provided with a self-defined TS electrical interface (i.e. the interface as shown in FIG. 18), such that the plug can't be inserted into ordinary USB receptacle but only be inserted into the physical interface of the device with this mixed type. In this way, when an external module with a self-defined TS interface is inserted, the engagement or disengagement of the contact or switch at the physical interface of the device may help to determine whether it is an external service module for specific TS data streams. When the plug is pulled out, it returns to the default state, i.e. the USB electrical interface, and vice versa.

Alternatively, the interface identification unit may identify an electrical interface with electrical identification method, which is to make determination through a handshake procedure, e.g. sending query signals and receiving response signals. When USB electrical interface is set as default, for example, if the handshake is successful, it is a TS electrical interface; otherwise, it is a USB electrical interface.

The identification of an electrical interface may be implemented by means of human-machine interaction, that is, to input the interface type for an electrical interface by manual input.

When the interface identification unit 1820 of the transport interface 1800 determines that a USB interface is connected currently, the transmitted data streams are USB data streams, and thus the received or transmitted data will be processed by the USB protocol processing unit 1830. When the interface identification unit 1820 determines that the self-defined TS interface is connected currently, the transmitted or received data streams are TS data streams, and thus the received or transmitted data will be processed by the MPEG TS protocol processing unit 1840.

Advantageous Effects

From the detailed descriptions to the embodiments of the invention with reference to accompanying drawings, it may be seen that the UTI (Universal Transport Interface) for communication and data transportation between a host device and an external service module as provided in the present invention is a transport interface that is based on USB specification and can transport MPEG TS data. Through the UTI, a DTV receiver may send the scrambled MPEG TS data to an external CA module for de-scrambling and receive the de-scrambled MPEG TS data via the transport interface. Accordingly, the CA function can be separated from the DTV receiver by using this UTI such that the manufacturers for devices such as DTV receivers and manufacturers for CA devices may develop their respective products independently. Meanwhile, the user may choose different operators or choose different value-added services available from the same provider by changing an external CA module.

Furthermore, since the UTI accords with USB specification, it can transport MPEG TS data as well as data which accords with USB specification, and thus it has good extensibility and hence a broader application range. Additionally, compared with the PCMCIA interface adopted in the European standard DVB-CI and the American standard HOST POD, the cost is lower and the interface is simple.

It is to be understood by those skilled in the art that various improvements and modifications can be made to the Universal Transport Interface (UTI) as disclosed in the present invention without departing from the basis of the present invention, the scope of which is to be defined by the appended claims herein.

What is claimed is:

1. An interface for transporting data streams between a digital signal processing host device and an external service module, comprising:
 a transceiving unit, configured to receive from and transmit to the digital signal processing host device USB packets which accord with a USB (Universal Serial Bus) specification;
 a detecting unit, configured to detect USB packets received by the transceiving unit, so as to determine whether the received USB packets carry data streams which accord with a particular specification and are available for the external service module;
 a conversion unit, comprising a S/P conversion unitconfigured to convert the received USB packets as serial asynchronous data streams to obtain the parallel synchronous data streams which accord with the particular specification when determining that the received USB packets carry the data streams which accord with the particular specification, wherein the S/P conversion unit comprises:
  a S/P conversion circuit configured to convert the serial asynchronous data into the parallel synchronous data streams;
  a first frequency multiplier configured to provide a multiplied clock of a local clock;
  a clock recovery circuit configured to perform phase-locking of the multiplied clock, to obtain a clock to be used for the S/P conversion circuit; and
 a first buffer configured to output parallel synchronous data streams when driven by the local clock.

2. The interface of claim 1, wherein the conversion unit comprises: an unpackaging unit, configured to unpackage the received data into the data which accords with the particular specification.

3. The interface of claim 1, wherein the conversion unit comprises:
 a packaging unit, configured to package the transmission data into the data which accords with the USB specification in bulk mode.

4. The interface of claim 2, wherein the conversion unit comprises:
 a packaging unit, configured to package the transmission data into the data that accord with the USB specification.

5. The interface of claim 4, wherein the particular specification is a MPEG specification.

6. The interface of claim 5, wherein the conversion unit further comprises:
 a P/S conversion unit, configured to convert parallel synchronous transmission data streams which accords with the MPEG specification into serial asynchronous data streams which accords with the USB specification;
 wherein the data which accords with the USB specification includes an integer multiple of packets which accord with the MPEG specification.

7. The interface of claim 6, wherein the P/S conversion unit further comprises:
 a second buffer configured to receive the parallel synchronous data streams and to output the parallel synchronous data streams when driven by a local clock;
 a second frequency multiplier configured to provide a multiplied clock of a local clock; and
 a P/S conversion circuit configured to convert the parallel synchronous data streams into the serial asynchronous data streams when driven by the multiplied clock.

8. The interface of claim 7, wherein any one of the data which accords with the USB specification and the data which accords with the MPEG specification comprises at least one of service data and control information, the control information being used to control operations of a device equipped with the interface.

9. The interface of claim 8, wherein the service data comprises at least one of audio data and video data.

10. The interface of claim 8, wherein the control information comprises at least one of information for implementing PnP (Plug and Play) function, information on resource allocation and information on the transmission rate to be used.

11. The interface of claim 10, wherein the control information may be transmitted in a data transfer mode of at least one of bulk data transfer and interrupt data transfer in the USB specification.

12. A digital signal processing apparatus, comprising:
 an interface, which includes:
  a transceiving unit, configured to receive and transmit USB packets which accord with USB (Universal Serial Bus) specification;
  a detecting unit, configured to detect the USB packets received by the transceiving unit, so as to determine whether the received USB packets carry data streams which accord with a particular specification and are available for the digital signal processing apparatus;
  an interface protocol identification unit, configured to identify an interface protocol of an external service module; and
  a conversion unit, comprising a S/P conversion unit configured to convert the received USB packets as serial asynchronous data streams to obtain the parallel synchronous data streams which accord with the particular specification when determining that the received USB packets carry the data streams which accord with the particular specification;
  wherein the particular specification is a MPEG specification;
  wherein the S/P conversion unit comprises:
   a S/P conversion circuit configured to convert the serial asynchronous data into the parallel synchronous data streams;
   a first frequency multiplier configured to provide a multiplied clock of a local clock;
   a clock recovery circuit configured to perform phase-locking of the multiplied clock, to obtain a clock to be used for the S/P conversion circuit; and
   a first buffer configured to output parallel synchronous data streams when driven by the local clock; and
 a processing unit, configured to perform at least one of playing, decrypting and storing the signals received via the interface.

13. The digital signal processing apparatus of claim 12, further comprising:
 a RF (Radio Frequency) processing unit, configured to demodulate the RF signals received by the digital signal processing apparatus, to transmit the demodulated signals via the interface.

14. The digital signal processing apparatus of claim 13, wherein the processing unit comprises:
 an audio decoding unit, configured to decode audio signals received via the interface;
 a video decoding unit, configured to decode video signals received via the interface;
 a playback unit, configured to play the decoded audio/video signals.

15. The digital signal processing apparatus of claim 14, further comprising:

a control unit, configured to extract a control command from the signals received via the interface;

wherein the playback unit plays the decoded audio/video signals according to the control command.

16. The digital signal processing apparatus of claim 15, wherein the RF (Radio Frequency) processing unit is further configured to transmit the control command.

17. The digital signal processing apparatus of claim 16, wherein the control command further comprises EPG (Electronic Program Guide) information.

18. The digital signal processing apparatus of claim 17, further comprising:

a graphics display unit, configured to display the EPG information according to the control command.

19. The digital signal processing apparatus of claim 14, further comprising:

a software update unit, configured to store the software data received via the interface and to update the software.

20. The digital signal processing apparatus of claim 14, further comprising:

a channel and tuner control information generation unit, configured to generate channel and tuner control information to choose a corresponding RF channel according to user requirement;

the channel and tuner control information is transmitted via the interface.

21. The digital signal processing apparatus of claim 12, further comprising:

an audio decoding unit, configured to decode the audio signals received via the interface, and to provide the decoded audio signals to a playback unit for playing;

a video decoding unit, configured to decode the video signals received via the interface, and to provide the decoded video signals to the playback unit for playing, the playback unit, configured to play the decoded audio/video signals received via the interface.

22. The digital signal processing apparatus of claim 21, further comprising:

a control unit, configured to extract a control command from the signals received via the interface;

wherein the playback unit plays the decoded audio/video signals according to the control command.

23. The digital signal processing apparatus of claim 22, wherein the control command further comprises EPG (Electronic Program Guide) information.

24. The digital signal processing apparatus of claim 12, wherein the processing unit comprises:

an acquisition unit, configured to acquire a user key;

a filtering unit, configured to filter the signals received via the interface, to obtain authorization information for a user;

a decryption unit, configured to perform decryption on the authorization information according to the user key, to obtain a de-scrambling key; and a de-scrambling unit, configured to de-scramble the signals received via the interface according to the de-scrambling key.

25. The digital signal processing apparatus of claim 24, wherein the de-scrambling unit sends the de-scrambled signals via the interface.

26. The digital signal processing apparatus of claim 24, further comprising:

a communication interface module, configured to receive and transmit data which accords with a particular transport protocol.

27. The digital signal processing apparatus of claim 26, wherein the particular transport protocol comprises at least one of Ethernet transport protocol, Cable Modem transport protocol, SmartCard transport protocol and wireless protocol.

28. The digital signal processing apparatus of claim 26, wherein the de-scrambled signals are transmitted via the communication interface module.

29. The digital signal processing apparatus of claim 25, further comprising:

a control unit, configured to generate control information according to a user requirement;

wherein the control information may be transmitted via the interface.

30. The digital signal processing apparatus of claim 25, further comprising:

a RF (Radio Frequency) processing unit, configured to demodulate the RF signals received by the digital signal processing apparatus, to transmit the demodulated signals via the interface.

31. The digital signal processing apparatus of claim 30, further comprising:

a control unit, configured to generate control information according to a user requirement;

wherein the RF processing unit is further configured to transmit the control information.

32. The digital signal processing apparatus of claim 12, further comprising:

a storage unit, configured to store signals received via at least one of the interface and the communication interface module.

33. The digital signal processing apparatus of claim 12, further comprising:

an EPG (Electronic Program Guide) information extracting and parsing unit, configured to extract and parse EPG information from the signals received via the interface;

wherein the interface transmits the parsed EPG information.

34. The digital signal processing apparatus of claim 12, further comprising:

a software downloading unit, configured to extract software data from the signals received via the interface.

35. The digital signal processing apparatus of claim 34, further comprising:

a software updating unit, configured to update the current software by using the extracted software data.

36. The digital signal processing apparatus of claim 34, wherein the software data is transmitted via the interface.

37. The digital signal processing apparatus of claim 15, further comprising:

a tuner control unit, configured to control the RF processing unit according to the control information received via the interface, to receive signals on a corresponding channel.

38. The digital signal processing apparatus of claim 31, further comprising:

a tuner control unit, configured to control the RF processing unit according to the control information received via the interface, to receive signals on a corresponding channel.

39. A method for transporting data streams between a digital signal processing host device and an external service module, comprising steps of:

receiving USB packets which accord with a USB (Universal Serial Bus) specification from the digital signal processing host device;

detecting the received USB packets to determine whether the received USB packets carry data streams which accord with a particular specification and are available for the external service module;

converting the received USB packets to obtain the parallel synchronous data streams which accord with the particular specification after determining that the received USB packets carry the data streams which accord with the particular specification;

transmitting to the external service module the converted transmission data which accords with the USB specification;

wherein the converting comprises:
- converting the USB packets into the parallel synchronous data streams;
- providing a multiplied clock of a local clock;
- performing phase-locking of the multiplied clock, to obtain a clock to be used for the conversion of the USB packets; and
- outputting parallel synchronous data streams when driven by the local clock.

40. The data transfer method of claim 39, wherein the converting the transmission data step further comprises the step of:
- packaging the transmission data into the converted data which accords with the USB specification.

41. The data transfer method of claim 39 wherein the particular specification is a MPEG specification.

42. The data transfer method of claim 39, further comprising:
- converting the data streams to be transmitted which accord with the particular specification into serial asynchronous packets which accord with the USB specification;

wherein the converting comprises:
- receiving the data streams and outputting the parallel synchronous data streams when driven by a local clock;
- providing a multiplied clock of a local clock; and
- converting the data streams into the serial asynchronous data packets when driven by the multiplied clock.

* * * * *

UNITED STATES PATENT AND TRADEMARK OFFICE
CERTIFICATE OF CORRECTION

PATENT NO. : 8,195,850 B2
APPLICATION NO. : 10/567047
DATED : June 5, 2012
INVENTOR(S) : Xingjun Wang et al.

It is certified that error appears in the above-identified patent and that said Letters Patent is hereby corrected as shown below:

On the Title Page, item (73) Assignee:   Replace "United Technologies, Inc., Beijing (CN)"
with --Tsinghua University, Beijing (CN)--

Signed and Sealed this
Nineteenth Day of February, 2013

Teresa Stanek Rea
*Acting Director of the United States Patent and Trademark Office*